United States Patent [19]

Biggs

[11] 4,266,468

[45] May 12, 1981

[54] CONTROL CYLINDER WITH REMOVABLE PISTON

[76] Inventor: Paul G. Biggs, 10200 De Soto #306, Chatsworth, Calif. 91311

[21] Appl. No.: 33,360

[22] Filed: Apr. 26, 1979

[51] Int. Cl.[3] ........................ F01B 7/00; F01B 31/10; F16J 1/10

[52] U.S. Cl. ........................................ 92/63; 92/86.5; 92/128; 92/129; 92/158; 92/169

[58] Field of Search .................. 92/128, 86.5, 171, 63, 92/129, 169, 158

[56] References Cited

U.S. PATENT DOCUMENTS

| | | | |
|---|---|---|---|
| 1,760,636 | 5/1930 | Fortune et al. | 92/86.5 |
| 2,577,462 | 12/1951 | Hackney | 92/63 |
| 2,853,347 | 9/1958 | Cooper, Jr. | 92/128 |
| 3,205,787 | 9/1965 | Volkmonn | 92/171 |
| 3,295,422 | 1/1967 | Bostwick | 92/128 |
| 3,805,669 | 4/1974 | Mitchell | 92/63 |
| 4,085,659 | 4/1978 | Stunkel | 92/63 |

*Primary Examiner*—Paul E. Maslousky
*Attorney, Agent, or Firm*—Michael P. Breston

[57] ABSTRACT

The cylinder has an open-ended longitudinal bore. A removable plug closes one end of the bore. A power piston is slidably mounted in the bore. A pressure inlet port admits pressure fluid into the bore between the plug and the piston for shifting the piston in the bore. A rod is slidably and preferably sealingly mounted in the opposite end of the bore. The rod shifts in response to an external force and to the force exerted by the power piston. The power piston is easily removed from the bore by removing the plug from the cylinder.

1 Claim, 7 Drawing Figures

CONTROL CYLINDER WITH REMOVABLE PISTON

BACKGROUND OF THE INVENTION

This invention has applications to control cylinders having pistons and piston rods fixedly coupled thereto. The invention will be described with reference to a particular application which illustrates the disadvantages of the prior art and the advantages of the present invention.

Since the description of the prior art will be facilitated with reference to the drawings, it will be made after the brief description of the drawings.

SUMMARY OF THE INVENTION

The control cylinder has an axial bore extending therethrough. A high-pressure head is detachably coupled to the front end of the cylinder and defines an inlet port for admitting high-pressure fluid into the front end of the cylinder bore. A low-pressure head is detachably coupled to the rear end of the cylinder. A shaft has a front end slidably and sealingly extending into the cylinder bore through the center of the low-pressure head. A free-floating power piston has front and rear faces and is slidably mounted in the cylinder bore between the front end of the shaft and the high-pressure head. A movable force-transmitting control member is coupled to the rear end of the shaft for exerting an axial force against the rear face of the piston. The fluid pressure exerts an axial force against the front face of said piston, whereby the piston shifts in the cylinder bore depending on the direction of the axial force resulting from the axial forces exerted against the front and rear faces of the piston. The shifting of the power piston determines the movement of the control member.

DETAILED DESCRIPTION OF THE PRIOR ART

Figure 1:
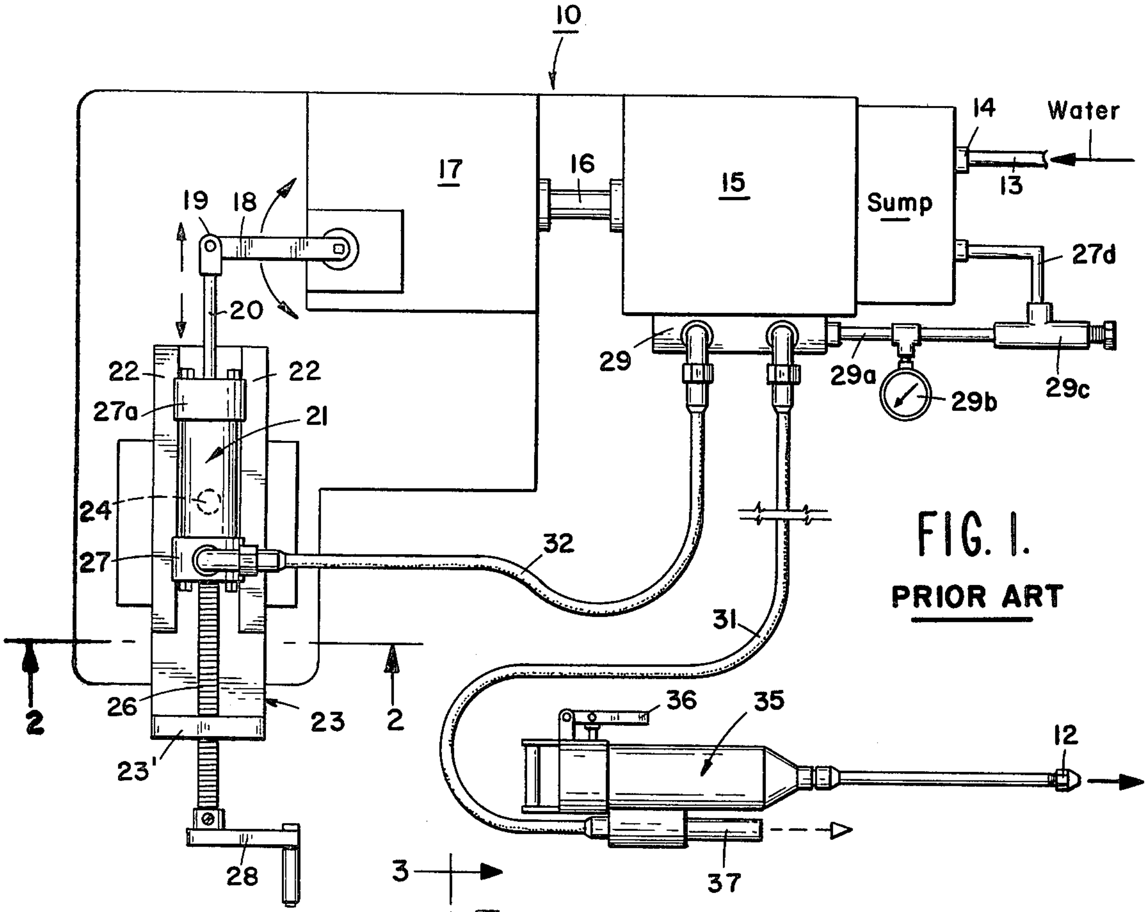
FIG. 1. PRIOR ART
FIG. 1 is a schematic top plan view of a known control system for a jet gun.
Figure 2:
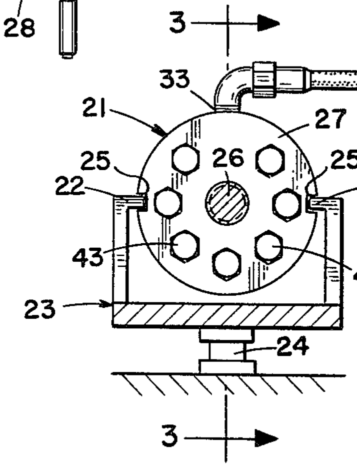
FIG. 2 is a view, partly in section, taken on line 2—2 of FIG. 1.
Figure 3:
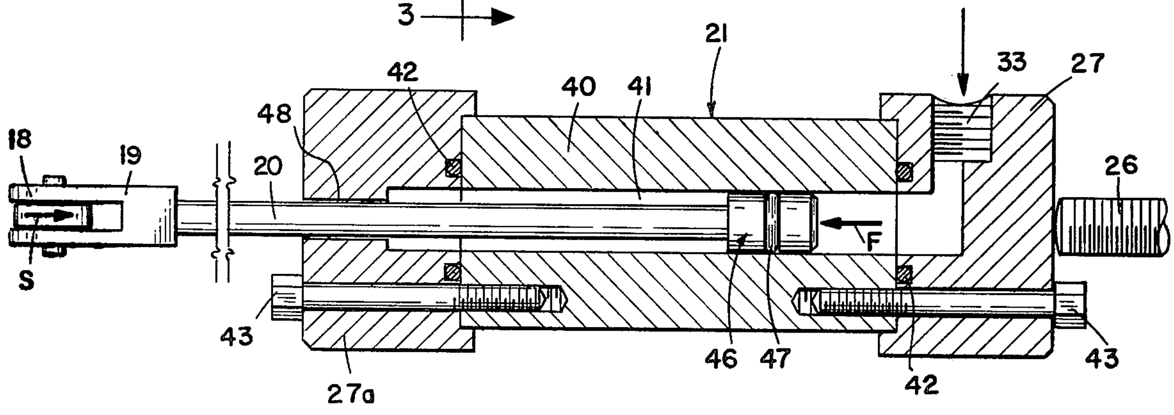
FIG. 3 is a view, partly in section, taken on line 3—3 of FIG. 1.
Figure 4:
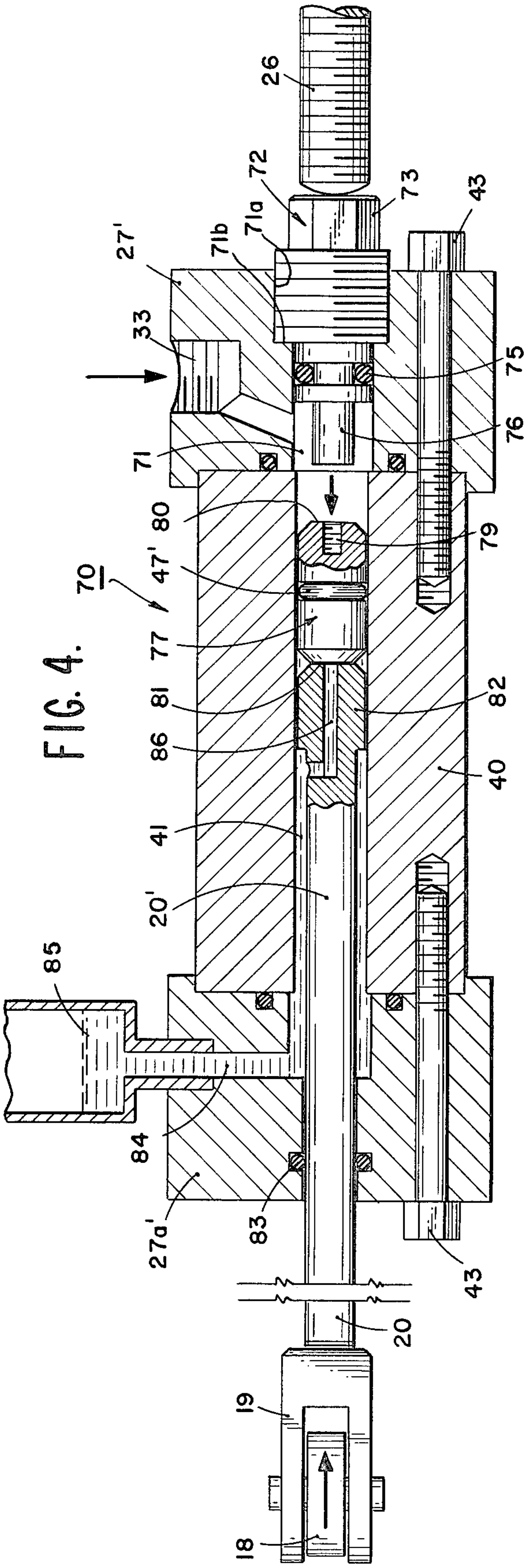
FIG. 4 is a view similar to FIG. 3 showing a control cylinder incorporating the improvements of the present invention.

With reference to FIGS. 1-3, there is shown a prior art system 10 for controlling the output of a high-pressure nozzel 12. Water is admitted through an inlet pipe 13 into the intake port 14 of a high-pressure pump 15. The shaft 16 of the pump is driven by a conventional power unit 17, the RPM of which is controlled by a pivotable control arm 18 which is coupled by a clevis 19 to the output shaft 20 of an RPM control unit 21. The control unit is slidably mounted on a pair of diametrically-opposite rails 22 which extend from a bracket 23 that is pivotably mounted on a pivot 24. The control unit 21 has a pair of diametrically-opposite slots 25 which accept the rails. A threaded adjusting rod 26 is threaded through the upright end wall 23' of the bracket 23 and abuts in the center of the high-pressure head 27 of the control unit 21. The threaded screw 26 is operated by a handle 28.

The pump's manifold 29 provides high-pressure water to a pair of hoses 31, 32. Line 29*a* connected to manifold 29 has a pressure gauge 29*b* and an adjustable pressure-release valve 29*c* which relieves excess pressure to a pump sump through line 27*d*. Hose 32 feeds high-pressure water into the inlet port 33 (FIG. 3) of control unit 21. Hose 31 is connected to a jet gun unit, generally designated as 35, which comprises a flow-control arm 36 that can control the flow of water either through a free-flow nozzle 37 or through the high-pressure nozzle 12.

The control arm 18 is spring biased counter-clockwise as viewed in FIG. 1, and RPM control shaft 20 is biased downwardly which produces a force S (FIG. 3). When the control arm 18 is fully rotated counter-clockwise within its permitted range, the power unit 17 will idle. Clockwise rotation of the control arm 18 increases the RPM of the power unit. The pressure at the output of the high-pressure nozzle 12 is controlled by the RPM of the power unit 17.

The RPM is regulated by the control unit 21 which consists of a cylinder 40 having a detachable high-pressure head 27 at the front end thereof and a detachable low-pressure head 27*a* having a center, reduced-diameter bore 48 without sealing means. A cylindrical bore 41 fully extends through the cylinder 40 and into a portion of heads 27, 27*a* which are sealed to cylinder 40 by 0-rings 42 and are secured thereto by bolts 43. One end of the control shaft 20 is made integral with a piston 46 having a sliding seal such as an O-ring 47. The other end of shaft 20 exits from the low-pressure head 27*a* and is coupled to the clevis 19.

The adjustable threaded rod 26 controls the initial position of the RPM control unit 21 on the guide rails 22 and, therefore, the idling speed of the power unit 17. The water pressure admitted into port 33 will constantly exert a force F against the power piston 46, thereby tending to shift the piston to the left, as viewed in FIG. 3, and increasing the RPM of the power unit 17 to a desired number of revolutions per minute. Depressing the flow control arm 36 on the gun unit 35 will cause water to flow out from the high-pressure nozzle 12. Lifting the control arm 36 will cause water to flow through the free-flow, low-pressure nozzle 37. In this manner when the high-pressure nozzle 12 is not in use, the pump 15 and the power unit 17 can continue to operate.

In use of the prior art system 10, the operator selects the desired size of nozzle 12 and retracts the threaded rod 26. The control unit 21 is pulled back on its rails 25 until the power piston 46 abuts the low-pressure head 27*a*. The RPM control arm 18 will then be in its extreme counter-clockwise or idle position. The power unit 17 is then started up which causes the pump 15 to deliver through the hose 32 high-pressure fluid into the inlet 33 of the high-pressure head 27. Hose 31 will supply high-pressure fluid to the gun unit 35 which will flow out through the free-flow nozzle 37 since the control arm 36 is biased into its up position. The pump 15 can run in this idle position until the control arm 36 is depressed, which causes fluid to flow out through the high-pressure nozzle 12. Handle 28 on rod 26 is rotated clockwise thereby moving the entire control unit 21 forward on its rails 25, which causes the RPM control arm 18 to rotate clockwise, which in turn increases the RPM of the power unit 17. The handle 28 is rotated until the adjustable rod 26 sufficiently moves the control unit 21 to provide the desired RPM which will give the desired pressure in nozzle 12.

When the high-pressure nozzle 12 is not used, the water will flow out through the free-flow nozzle 37 which results in a decrease in the pump's pressure. That decrease is sensed by the piston 46 resulting in its being shifted to the right (as viewed in FIG. 3) and, therefore, in a decrease of the RPM of the power unit 17.

DISADVANTAGES OF THE PRIOR ART

The main disadvantage of the prior art system 10 was due to the fact that the sliding O-ring seal 47 on the piston 46 would be in need of very frequent replacement, in fact, on the order of every two work shifts. The down time for the entire system 10 was considerable resulting in an appreciable econimic loss.

Another serious disadvantage was due to the construction of the control unit 21 in that to remove the piston 46 required the complete removal of the high-pressure head 27. To remove the latter required the removal of at least 7 bolts 43, removal of the head 27, replacement of the O-ring seals 42, replacement of the head 27 and of the bolts 43.

The above disadvantages have been substantially remedied by the present invention, as will be apparent from the following description.

DETAILED DESCRIPTION OF THE PREFERRED EMBODIMENT OF THE INVENTION

With reference now to FIGS. 4–7, the same numerals will be used whenever possible and similar elements will be designated with a prime (′), to facilitate the description of the invention.

The improved RPM control unit 70 of the invention is provided with a modified high-pressure head 27′ which is provided with a center bore 71 having an enlarged diameter end portion 71*a* forming a shoulder 71*b*. A threadedly removable plug unit, generally designated as 72, having a wrench head 73 at the outer end thereof (FIG. 5), a reduced diameter portion 74 carrying an O-ring seal 75 which seals off bore 71, and a further reduced diameter stop member 76. A floating piston, generally designated as 77, carries an O-ring 47′ on its outer cylindrical wall. A threaded center hole 79 extends axially into the body of piston 77 from the front face 80 thereof. The back face 81 engages, in use, an enlarged head portion 82 of a control shaft 20′. The shaft 20′ sealingly engages an O-ring 83 in the center bore of the low-pressure head 27*a*′.

In the preferred embodiment, the low-pressure head 27*a*′ is also provided with a radial bore 84 which receives by gravity lubricating oil from an oil reservoir 85. The radial channel 84 communicates with the axial bore 41 of the cylinder 40. An axial-and-radial oil flow passageway 86 allows oil trapped between the head portion 82 and the floating piston 77 to return to the oil reservoir 85.

In all other major respects, system 10 shown in FIG. 1 remains the same. Accordingly, the description of the operation previously given will apply as far as those parts not described in connection with FIGS. 4–7.

Figure 7:
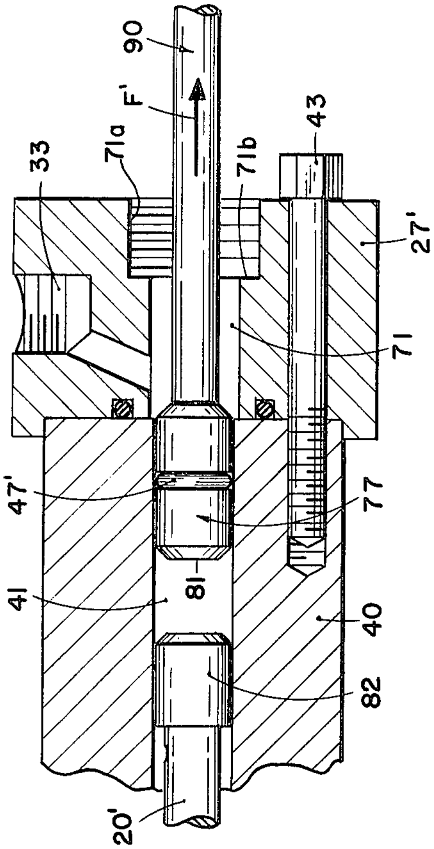
FIG. 7 is a partial view of the cylinder of FIG. 4 illustrating the removal of the power piston therefrom.
Figure 5:
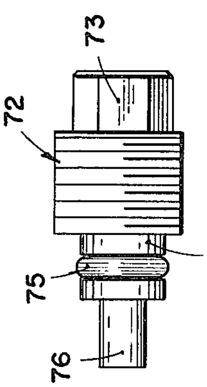
FIG. 5 is a side view of the removable plug in the cylinder of FIG. 4.
Figure 6:
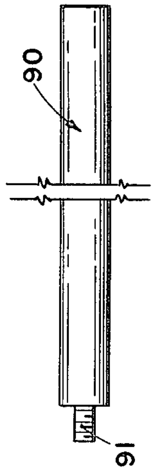
FIG. 6 is a view of a retrieving hook for removing the piston from the cylinder of FIG. 4.

In operation of the modified RPM control unit 70, the enlarged head portion 82 of shaft 20′ does not carry an O-ring and, therefore, only the O-ring 47′ on the floating piston 77 is likely to wear out. With the lubrication system as described, such wear is considerably slower than in the known control unit 21 (FIG. 3). But when the O-ring 47′ does wear out, it can be easily replaced as follows: the adjustable threaded rod 26 is moved a distance from the wrench head portion 73 of plug 72. The plug 72 is unscrewed by rotating the wrench head 73 with a suitable wrench. A bar tool 90 having a threaded pin 91 (FIG. 6) is then threaded into the hole 79 which allows the removal of the floating power piston (77) by the application of a pulling force represented by the arrow F′ on the bar 90 (FIG. 7). After the O-ring 47′ is replaced on the floating piston 77, it is reinserted with tool 90 into bore 41. A new O-ring 75 can be installed and the plug unit 72 is then replaced.

The adjustable rod 26 is rotated to its original position and the RPM control unit 70 is again ready for operation. The adjustable rod 26 abuts against the plug member 72. The stop member 76 on the plug 72 limits the movement of the floating piston 77, thereby permitting high-pressure water to continuously have access to and become exerted on the front face 80 of piston 77.

The advantages of the present invention as compared to the drawbacks of the prior art will be obvious from a comparison of FIGS. 1–3 on one hand, and FIGS. 4–7 on the other hand. The floating piston 77 can be replaced with ease and the down time of the system 10 previously described is accordingly drasticaly reduced.

While the invention has been described with reference to a particular application, it will be apparent that it is not limited thereto.

What I claim is:

1. A control cylinder having an axial bore extending therethrough,
   - a high-pressure head detachably coupled to the front end of said cylinder and defining an inlet port for admitting high-pressure fluid into the front end of said cylinder bore,
   - a low-pressure head detachably coupled to the rear end of said cylinder,
   - a shaft having an enlarged front end, slidably mounted in said cylinder bore, and a rear end sealingly extending outwardly through the center of said low-pressure head,
   - a free-floating power piston having front and rear faces and being slidably and sealingly mounted in said cylinder bore between said enlarged front end of said shaft and said high-pressure head, said enlarged front end being detached from the rear face of said power piston,
   - a movable force-transmitting control member coupled to the rear end of said shaft for exerting an axial force against said shaft,
   - said high-pressure head having a threaded center hole,
   - a plug unit threadedly coupled to said center hole,
   - said power piston being removable from said cylinder bore through said threaded hole,
   - said enlarged front end defining an axial channel in fluid communication with said cylinder bore, and
   - said cylinder bore being coupled to a source of lubricating fluid.

* * * * *